March 30, 1937.  J. M. HARDESTY  2,075,520
TOOL
Filed Dec. 18, 1935
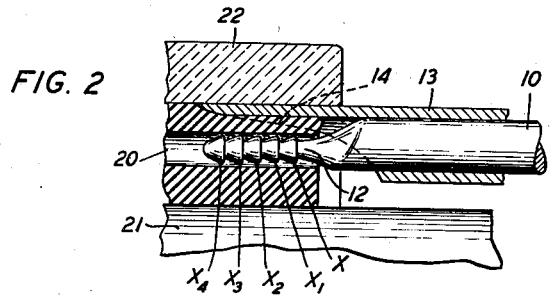
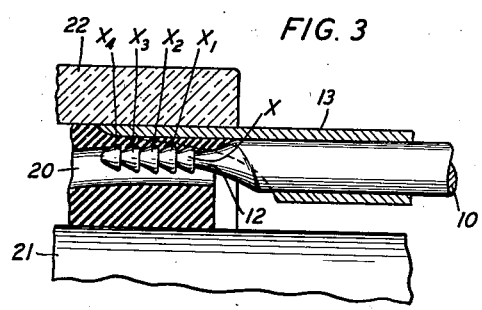
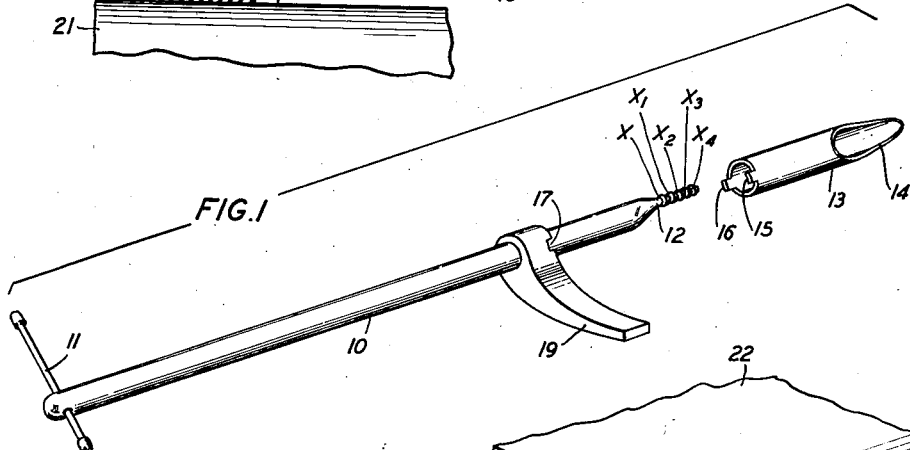
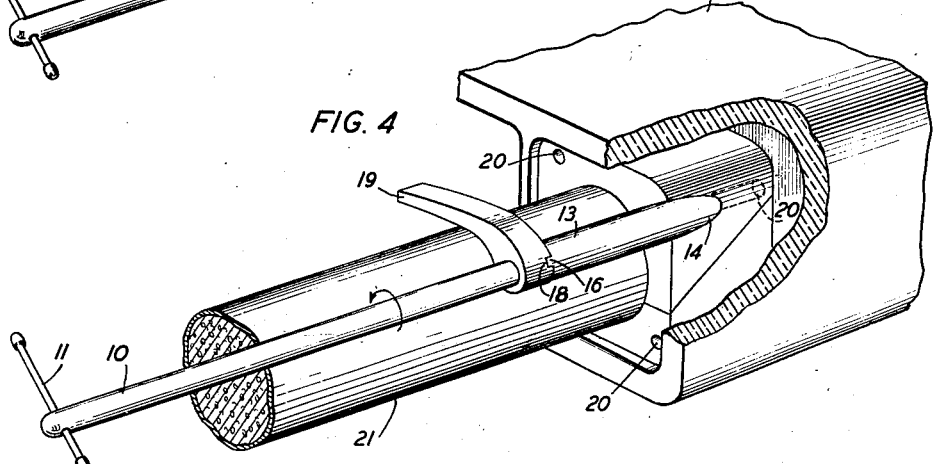
INVENTOR
J.M. HARDESTY
BY J. MacDonald
ATTORNEY Patented Mar. 30, 1937

2,075,520

UNITED STATES PATENT OFFICE 2,075,520

TOOL

James M. Hardesty, East Orange, N. J., assignor to Bell Telephone Laboratories, Incorporated, New York, N. Y., a corporation of New York Application December 18, 1935, Serial No. 55,074

3 Claims. (Cl. 81—8.1)

This invention relates to tools, and more specifically to a tool for removing rubber bushings from cable conduits.

Portions of the walls in manholes, for example, are built with hollow tile conduits through which the ends of lead-covered cables pass with considerable clearance. These cables are generally supported in concentric relation with the inner surfaces of the walls of the conduits by rubber bushings having central openings corresponding to the diameter of the lead cable sheath and their peripheries to the contour of the hole in the conduit. The rubber bushings are split diagonally on one side thereof for permitting their mounting over the cable and into the conduit, after which they are compressed lengthwise by the clamping action of steel plates upon the tightening of bolts passing through holes in the steel plates and registering holes in the rubber bushings for expanding the bushing in radial direction into firm contact with the lead sheath of the cable and the wall of the conduit to form a seal therebetween in the manner of an ordinary stuffing-box for preventing water and gas which may be leaking from adjacent pipes entering the manhole. In practice, however, it has been found that after a certain length of time in service these bushings adhere to the lead cable sheath and to the walls of the conduit, which renders difficult their removal by ordinary methods.

The object of the invention is to provide a tool of the type above referred to, which will be simple and convenient to use.

According to the invention, a tool is provided in which means carried by a rod in eccentric relation therewith cooperates with a wedge-shaped member for gripping opposite sides of a portion of the rubber bushing upon a small turning movement of the rod relative to the wedge-shaped member for attaching the bushing to the tool. Means is provided for preventing the turning movement of the wedge member upon the rotary movement of the rod which is effected through the operation of a handle at the other end of the rod, the handle also affording means for imparting a pulling force on the tool for withdrawing the rubber bushing from the conduit subsequent to the gripping or clamping action of the tool on the bushing.

Other novel features and advantages of the invention will appear from the following description and by the claims appended thereto, reference being had to the accompanying drawing, in which:

Fig. 1 is a view of the tool showing the wedge member removed from its supporting rod;

Fig. 2 is a partial view of the tool showing the wedge member and the eccentric portion of the rod in position on the rubber bushing, the wedge member being shown in section;

Fig. 3 is a view similar to that of Fig. 2 showing a portion of the bushing clamped between the wedge member and the gripping portion of the rod, the rod being shown in position 180 degrees from that shown in Fig. 2; and Fig. 4 is a perspective view showing a rubber bushing in position in the cable conduit, the tool being shown in gripped position on the bushing.

In the several views, 10 is a rod which is provided at one end with a handle 11 and at its other end with a reduced portion 12 having its longitudinal axis disposed eccentrically with respect to the axis of rod 10. The reduced portion 12 is provided with ratchet-shaped teeth $x$, $x1$, $x2$, $x3$ and $x4$, as shown in Figs. 1, 2, and 3 provided for a purpose that will be hereinafter described in detail.

A sleeve 13 which is drilled for loosely engaging the rod 10 is formed at one end with a wedge-shaped portion 14 and at its other end with clutch-shaped teeth 15 and 16 for engagement with registering notches 17 and 18 in a lever arm or handle 19 shown in Figs. 1 and 4, also loosely mounted on the rod 10.

The lever arm 19 is preferably curved so as to rest on the lead cable sheath 21 when the eccentric portion 12 of the rod 10 and the sleeve 13 are placed on the rubber bushing 22, as shown in Figs. 2, 3 and 4.

The distance from the longitudinal axis of the reduced or eccentric portion 12 with respect to the axis of rod 10 is such that this reduced portion registers with one of the bolt holes 20 in the corner of bushing 22 when the tool is placed on the bushing, as shown on Fig. 2, the turning movement of rod 10 in the direction indicated by the arrow in Fig. 4 being effective to clamp that portion of the rubber between the teeth $x$, $x1$, etc. of eccentric portion 12 and the wedge portion 14 of sleeve 13 for firmly attaching the bushing to the tool.

The abutting engagement of lever arm 19 on the lead cable sheath 21 as shown in Fig. 4 effectively holds the sleeve against movement during the rotation of the rod and thereby prevents the sleeve 13 from being cammed back, due to the pressure of the rubber against its beveled side.

In a typical use of this tool for the removal of a rubber bushing from a cable conduit which is best shown in perspective in Fig. 4 is as follows: The sleeve 13 is first slipped off the rod 10 and inserted between the inner wall surface of the conduit 22 and the periphery of the rubber plug, as shown in Figs. 2, 3 and 4. The rod 10 is then inserted in the bushing 13 with its eccentric portion 12 registering with the bolt hole 20 at the corner of the bushing and the notches 17 and 18 of the handle 19 engaging the teeth 15 and 16 of the sleeve 13, but with the handle 19 abutting against the lead sheath 21 as shown. When the tool is in that position a turning movement of the rod 10 through its handle member 11 in the direction indicated by the arrow shown in Fig. 4 is effective to squeeze that portion of the rubber between the wedge portion 14 of sleeve 13 and the eccentric portion 12, thus positively securing the rubber bushing to the tool for removing the bushing from the cable conduit by a pulling action applied on the tool in line with respect to the longitudinal axis of the rod 10.

It is understood that many changes may be made to the tool of the invention without departing from the scope of the appended claims.

What is claimed is:

1. A tool for removing rubber bushings from cable conduits, said tool comprising two relatively movable elements, each of said elements having means for engaging opposite sides of a portion of the bushing, means for moving one of said elements toward the other element, and manual means for preventing the movement of the last-mentioned element upon the operation of the first element for gripping such a portion and thereby securing the bushing to said tool for removing the bushing from the conduit by a pulling force applied to said tool.

2. A tool for removing rubber bushings from cable conduits, said tool comprising a sleeve having a wedge element for engaging the outer peripheral surface of the bushing, a rod rotatably mounted in said sleeve having a gripping portion for engagement with a bolt hole in the bushing and cooperating with said wedge element upon the turning movement of said rod for securing the rubber bushing to said tool.

3. A tool for removing rubber bushings from cable conduits, said tool comprising a sleeve, a wedge portion extending from the sleeve for engaging the bushing, a rod rotatable in said sleeve, a gripping portion formed eccentrically at the end of said rod for engaging a bolt hole in the bushing, a handle for rotating said rod for moving said eccentric portion toward said wedge portion for securing said bushing to said tool, and a handle for holding said sleeve against movement upon the movement of said rod.

JAMES M. HARDESTY.